United States Patent [19]
Mattson

[11] Patent Number: 4,656,538
[45] Date of Patent: Apr. 7, 1987

[54] DISK DRIVE CONTROL SYSTEM
[75] Inventor: Gary L. Mattson, Thousand Oaks, Calif.
[73] Assignee: Xebec Development Partners, Ltd., San Jose, Calif.
[21] Appl. No.: 797,932
[22] Filed: Nov. 14, 1985
[51] Int. Cl.$^4$ ............................................. G11B 5/56
[52] U.S. Cl. .................................................... 360/77
[58] Field of Search ......................................... 360/77

[56] References Cited
U.S. PATENT DOCUMENTS 4,087,843  5/1978  Louis et al. ............................ 360/77
4,511,938  4/1985  Betts ...................................... 360/77

OTHER PUBLICATIONS

IBM Technical Disclosure Bulletin, vol. 20, No. 5, Oct. 1977, pp. 1789-1791, Rotating Record Disk Initialization for Sector Servoing, Dennison et al.

Primary Examiner—George G. Stellar
Attorney, Agent, or Firm—Spensley Horn Jubas & Lubitz

[57] ABSTRACT

A disk drive control system includes servo sectors written on a disk, with each sector containing three sets of marker pulses arranged so that three adjacent marker pulses from each of the sets spans two tracks. Positional control utilizes a function comprising a ratio whose denominator value represents the sum of the amplitudes of the two largest amplitude marker pulses detected by the read/write head while traversing a servo sector and who numerator represents the differences in amplitude between said two largest amplitude marker pulses.

21 Claims, 5 Drawing Figures

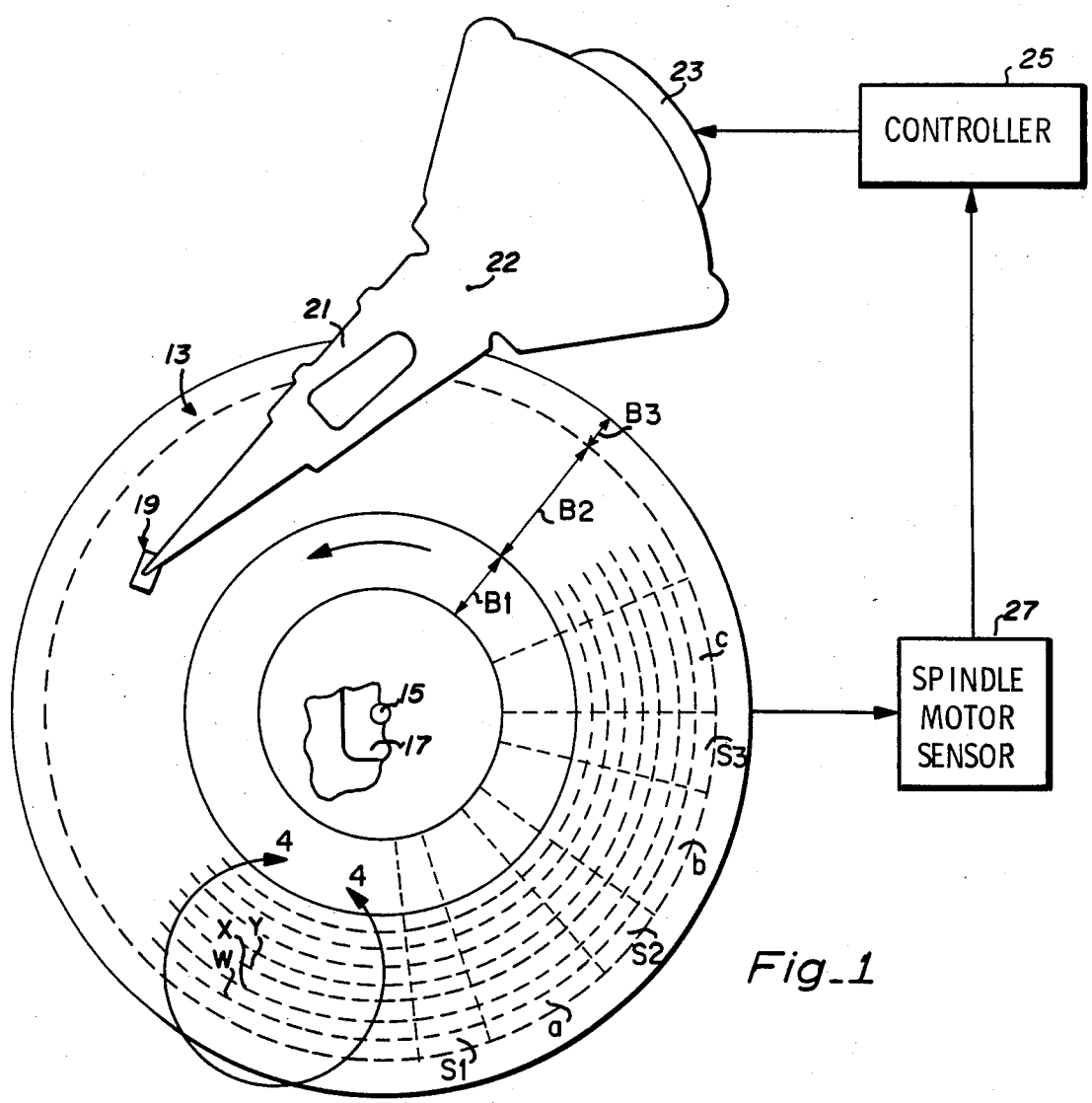
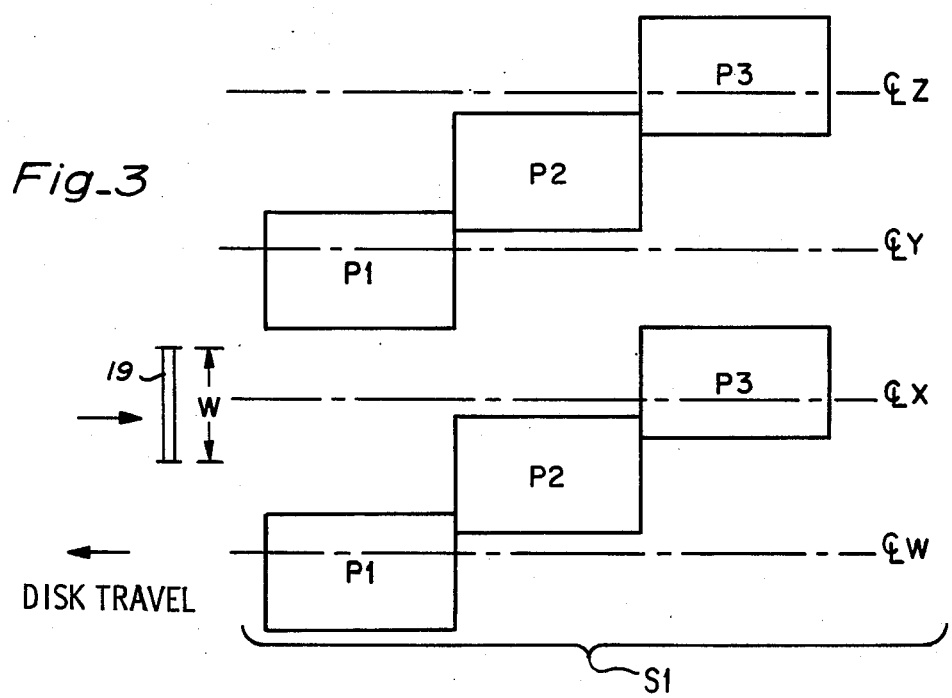

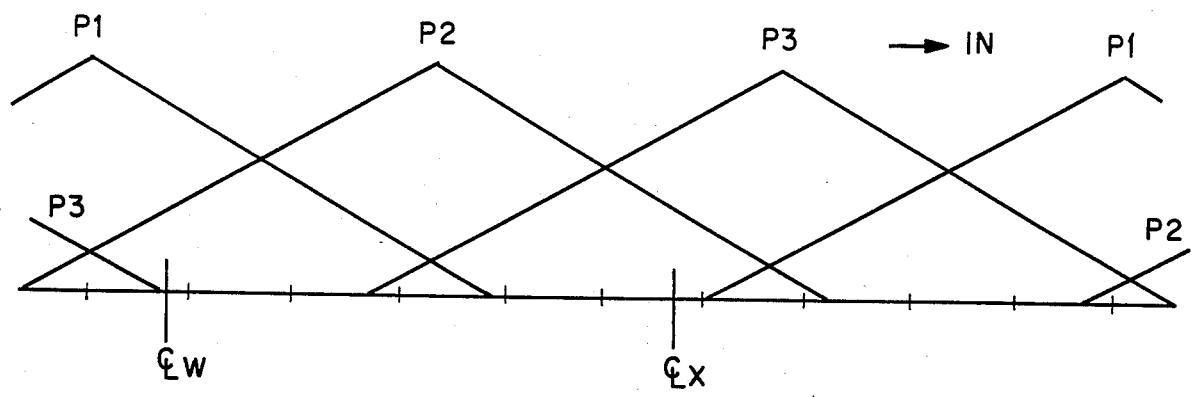
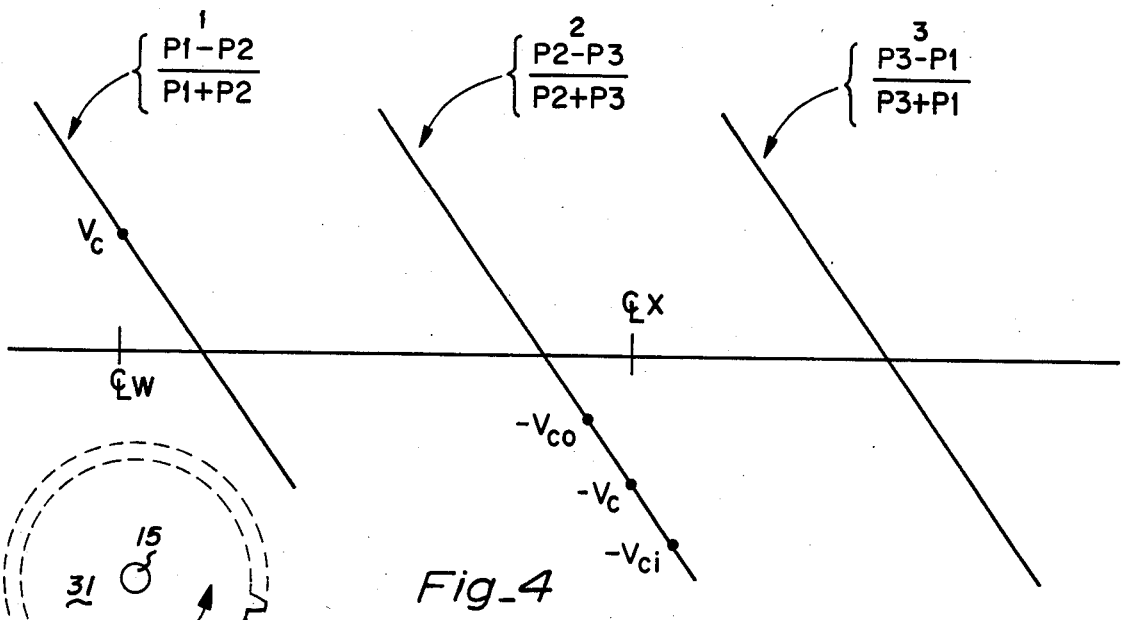
Fig_4
Fig_5
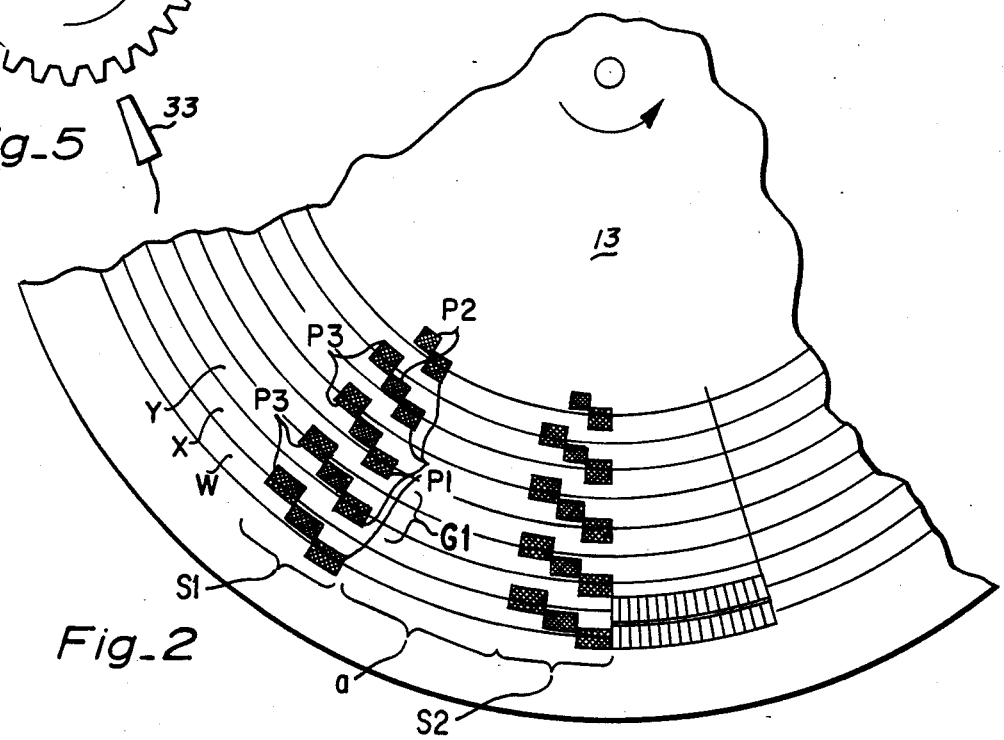
Fig_2

DISK DRIVE CONTROL SYSTEM

BACKGROUND OF THE INVENTION

1. Field of the Invention

The present invention relates to a control system for a magnetic disk drive system and, more particularly, to an improved method to control movement of a read/write transducer associated with a magnetic disk drive system.

2. Description of the Prior Art

In the field of electronic data handling, it is conventional to store data in binary form on the face of a rotatable disk. In operation, such a disk is rotated by a so-called spindle motor and the binary data is encoded upon, or retrieved from, the face of the disk by a movable electromagnetic transducer device often referred to as a read/write head. More particularly, the binary information is magnetically encoded on the face of the disk in concentric rings, called tracks, and the read/write transducer is selectively positioned by a pivoted read/write arm to move across the face of the disk in order to locate a particular track at which information is to be recorded or retrieved. Once a desired track is located, rotation of the magnetic disk will bring the read/write transducer to a particular location on the track, called a sector location, at which the read or write operation will be accomplished. A typical five and one-quarter inch diameter disk, for example, has four hundred to six hundred tracks for data storage and thirty-two sectors per track.

In many magnetic recording disk systems, the read/write transducer is driven to seek a desired track on the disk by means of a motor called a stepper motor coupled to a capstan mechanism. Such motors and capstan mechanism translate electrical commands from a controller for the disk drive system to discrete mechanical steps of the read/write transducer across the face of the magnetic recording disk. In such systems, to accurately locate the read/write transducer at a particular location on a desired track on a magnetic disk, it is necessary that the controller receive certain orientation information. Accordingly, in a typical closed-loop servo system, the controller will cause the read/write arm to move such that the read/write transducer is placed at a track which is calculated to be the desired track; then, once the read/write transducer is on that track, the transducer will read information from the track to verify that the location is, in fact, the desired one.

SUMMARY OF THE INVENTION

A primary object of the present invention is to provide an improved servo system of relatively low cost to effectively control the movement of a read/write arm and transducer in a magnetic disk drive system utilizing a non-stepper motor to position the read/write transducer.

More particularly, an object of the present invention is to provide an improved servo system to control the positioning movement of a read/write transducer in a magnetic disk drive system utilizing a non-stepper motor such as voice coil motor to position the read/write transducer.

In accordance with the preceding objects, the preferred embodiment of the present invention provides a disk drive control system wherein the read/write arm is driven by a non-stepper motor and wherein equally spaced-apart servo sectors are formed on the face of the disk with each of the servo sectors containing three sets of marker pulses, with the marker pulses in each set being radially aligned and spaced-apart radially from one another. The marker pulses in the first set are placed upon the disk latitudinally adjacent and radially outward of the mark pulses of the second set which, in turn, are latitudinally adjacent and radially outward of the marker pulses of the third set. Further, the marker pulses are arranged such that any group of three adjacent pulses spans two tracks on the face of the disk. The system further includes a read/write transducer mounted to the read/write arm and having an area of magnetic pick-up exceeding at least two-thirds of the centerline to centerline distance between adjacent tracks; synchronizing means to sense rotational motion of the disk and to provide first output signals coinciding with the beginning of each servo sector, second output signals to indicate the expected time of arrival of said second set of marker pulses within the sector, and third output signals to indicate the expected time of arrival of said third set of marker pulses within the sector. Further in the system, a controller compares the amplitudes of the marker pulses transversed by said read/write transducer within the servo sector and provides electrical position correcting signals to control the operation of the non-stepper motor, and hence the movement of the read/write arm according to the detected amplitudes of the marker pulses.

In accordance with the preceding, a primary advantage of the present invention is to provide an improved servo system of relatively low cost to effectively control the movement of a read/write arm and transducer in a magnetic disk drive system utilizing a non-stepper motor to position the arm carrying the read/write transducer.

More particularly, an advantage of the present invention is to provide an improved servo system to control the positioning movement of a read/write transducer in a magnetic disk drive system utilizing a non-stepper motor such as a voice coil motor to position the arm carrying the read/write transducer.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a functional diagram showing components of a control system according to the present invention for use in conjunction with a magnetic data recording disk, a portion of which is cut away to illustrate an otherwise hidden component;

FIG. 2 is a diagram, drawn to an enlarged scale, schematically illustrating a portion of the face of the disk shown in FIG. 1;

FIG. 3 is a diagram drawn to a further enlarged scale schematically illustrating a portion of the face of the disk of FIG. 1;

FIG. 4 is a graphical illustration of electrical signals generated during operation of the system of FIG. 1; and FIG. 5 is a plan view of components of the system of FIG. 1 for sensing angular position of the disk.

DETAILED DESCRIPTION OF THE PREFERRED EMBODIMENT

In the system in FIG. 1, a magnetic data storage disk 13 is mounted for rotation about a central spindle 15 driven by a spindle motor 17. (In the drawing, a portion of the disk 13 is cut away to reveal the spindle motor 17 which would otherwise be hidden from view.) FIG. 1 also generally shows an electromagnetic read/write transducer 19 for reading information from the face of the disk 13 or for writing information thereon in binary form, an arm 21 pivotably movable about a pivot point 22 for moving the read/write transducer 19 across the face of the disk 13, a motor 23 connected for angularly positioning the arm 21 about the pivot point 22, and a controller 25 for controlling the operation of the motor 23. In practice, the controller 25 is a conventional microprocessor.

Also in the system in FIG. 1, a sensor system 27 is provided to sense angular position of the spindle 17 and to provide such information to the controller 25 for purposes of synchornization of operation of the system. In the embodiment shown in FIG. 5, the sensor system 27 comprises a toothed wheel 31 keyed to the spindle 15 (or the rotor of the spindle motor) to rotate therewith and a magnetic reluctance sensor 33 fixedly mounted adjacent to the periphery of the toothed wheel 31 to sense passage of the individual teeth of the wheel past the sensing point. In practice, the reluctance sensor 33 provides an output pulse each time that the leading edge of one of the teeth on the wheel passes the sensing point. Also, in practice, forty-six teeth are provided upon the toothed wheel 31 and, accordingly, the sensor 33 provides forty-six output pulses for each revolution of the disk 13. (Accordingly, in FIG. 5, the size and space of the teeth on the toothed wheel 31 have been exaggerated for purposes of clarity.) Intermediate synchronizing signals may also be provided so that, for example, two signals equally spaced apart in time are generated after each signal designating the leading edge of a tooth.

Referring again to FIG. 1, the motor 23 is a so-called voice coil motor. Such motors may be contrasted with DC stepping motors. In a DC stepping motor, the output shaft of the motor rotates a specific angular distance for each electricl input pulse. By way of contrast, in a voice coil motor, the input signals need not be pulses and the response of the motor (i.e., the rotation of its output shaft) does not necessarily occur in discrete angular steps.

For purposes of explanation, the face of the disk 13 in FIG. 1 is shown as divided into three distinct bands B1, B2 and B3. In practice, the three bands are respectively referred to as the inner guard band, the data band, and the outer guard band. Normally, only the data band B2 is utilized to store binary information for processing by the host computer system (not shown) which is served by the disk 13. Further, FIG. 1 shows the data band B2 divided into concentric tracks whose centerline are designated w, x, and y. In the drawing, the width of these tracks has been exaggerated for ease of explanation; in actual practice, the data band on a typical three and one-half inch diameter disk will comprise more than three hundred adjacent data tracks and, typically, will have a track density of more than four hundred tracks per radial inch.

Further, FIG. 1 also shows the tracks w, x, y, etc. divided into spaced-apart sectors a, b, c, etc. The binary information for processing by the host computer system served by the disk 13 is stored on the tracks w, x, y, etc. within the sectors a, b, c, etc. encompassed by the data band B2. To denote the information storage function, the sectors a, b, c, etc. are herein referred to as information sectors. The angular widths of the information sectors a, b, c, etc. are exaggerated in the drawing for ease of explanation; in practice, a three and one-half inch diameter data storage disk will have forty-six information sectors per track, with each sector having the capability of storing several hundred bytes of information in digital form. Located between the information sectors a, b, c, etc. are so-called "servo sectors" S1, S2, etc., arranged such that each information sector is separated from an adjacent information sector by one of the servo sectors; accordingly, if a disk utilizes forty-six information sectors, a total of forty-six servo sectors will also be provided. In practice, the servo sectors S1, S2, S3, etc. comprise about ten percent of the usable area of the face of the disk (i.e., thirty-six degrees); accordingly, the remaining ninety percent of area of the disk face is utilized for the information sectors a, b, c. The function of the servo sectors is to provide information, written upon the disk in magnetic form, to assist in positioning the read/write transducer 19 on the face of the disk 13.

Referring now to FIG. 2, it can be seen that each servo sector S1, S2, S3, etc. includes three sets of radially-aligned magnetic marker pulses. In the drawings of FIGS. 2 and 3, the magnetic pulses in the first set are graphically designated P1, the pulses in the second set are designated P2, and the pulses in the third set are designated P3. The individual marker pulses are magnetically indistinguishable from one another; thus, any one marker pulse P1 is magnetically the same as any other pulse P1, and is magnetically the same as any pulse P2 or P3. In practice, each marker pulse is a data burst of a 1.8 megahertz sine wave, and the duration of each burst is about eight to ten microseconds when the disk 13 is rotating at about sixty revolutions per second.

Within each servo sector S1, S2, S3, etc., the sets of marker pulses P1, P2 and P3 are geometriclly arranged relative to one another such that the marker pulses P1 counter-clockwise preceed marker pulses P2, and the marker pulses P2 counter-clockwise preceed marker pulses P3. Further, the sets of marker pulses are geometrically arranged relative to one another within each servo sector such that groups of three adjacent marker pulses P1, P2 and P3 are defined wherein the pulse P1 is radially outward of, axially offset and contiguous with an adjacent marker pulse P2 which, in turn, is radially outward of, axially offset and contiguous with an adjacent pulse P3. In the preferred embodiment, the radial width of the marker pulses is such that a group of three of the pulses P1, P2 and P3 spans two tracks, centerline-to-centerline, on the face of the disk 13 with some overlap between the pulses in the radial direction. Such overlap is shown in the group of three marker pulses in FIG. 2 indicated by the bracket G1, where the pulse P3 extends to a location radially outward of the location where the pulse P2 begins, and the pulse P3 extends at a location radially outward of the location where the pulse P1 begins; together, the pulse group G1 spans tracks x and y.

FIG. 3 schematically shows two groups of marker pulses P1, P2 and P3 and the read/write transducer 19. In practice, the width "W" of the transducer 19 is about eighty percent of the width of a track; thus the transducer 19 will span portions of at least two of the pulses P1-P3 and, in certain circumstances, may span portions of all three pulses.

FIG. 4 shows the relative magnetic field strength exerted by the pulses P1, P2, and P3 as a function of radial position of the read/write transducer 19 relative to the centerlines of tracks w, x and y while the transducer 19 is in a servo sector such as S1. More particularly, the vertical axis in the upper graph in FIG. 4 shows the amplitude of pulses read by the read/write transducer 19 as the transducer moved radially inward in servo sector S1 while the disk 13 rotated counterclockwise beneath the transducer. (In the drawing, the radially inward direction is designated by the arrow labelled IN, and the centerline locations of the tracks w and x are labeled.) Thus, at a short distance radially outward of the centerline of track w in servo sector S1, the read/write transducer would read the maximum amplitude of pulse P1; at that location, the amplitudes of pulses P2 and P3 are relatively smaller and equal to one another. As the read/write transducer 19 moves radially inward across the face of the disk 13 in servo sector S1 while the disk 13 rotates, the amplitude read for marker pulse P1 decreases and the amplitude read for pulse P2 increases toward a maximum at a location approximately at the boundary between tracks w and x; at that location, the amplitudes of the pulses P1 and P3 are relatively smaller and are equal to one another. As the transducer 19 and disk 13 continue to move relative to one another with the transducer travelling radially inward in servo sector S1, the amplitude read for the pulse P2 decreases and the amplitude of the marker pulse P3 increases. When the read/write transducer 19 moves to a position slightly radially inward of the centerline of track x, the amplitude of pulse P3 is a maximum, and the amplitudes of pulses P2 and P1 are relatively smaller and equal to one another. Still further, FIG. 4 shows that the amplitude of pulse P3 begins to decrease as the read/write transducer 19 moves further radially inward over a second pulse P1. (In this example, the second pulse P1 would lie in servo sector S2 which is separated from sector S1 by the data sector "a", as shown in FIG. 1.)

It should be noted that the preceding description is consistent with the diagram of FIG. 3 which shows the centerline of track w slightly radially inward of the mid-point of pulse P1, and the centerline of track x slightly radially outward of the mid-point of pulse P3.

With the foregoing in mind, the function and operation of the system of the present invention can be understood. The first function to be explained will be the "servo writing" function; then the "tracking" and "seeking" functions will be explained.

In the servo writing operation, the disk 13 is rotated by the spindle motor 17 and the read/write arm 21 is controlled to move from some initial location two-thirds of a track radially after each revolution of the disk 13. That is, the read/write arm 21 maintains a generally fixed location during a revolution of the disk 13 and, after the revolution is completed, moves a distance radially equal to two-thirds of the width of a track. (In this art, the radial distance from the centerline of one track to the centerline of an adjacent track is referred to as the "track pitch"; thus, it can be said that the read/write arm 21 is moved a radial distance equal to two-thirds of the track pitch after each revolution of the disk 13.) During any given revolution of the disk 13, the beginning of each of the servo sectors S1, S2, etc., is sensed by the spindle motor sensor 27 and the read/write transducer 19 is operated to write the pulses P1 (i.e. the 1.8 megahertz sine wave bursts) immediately following the beginning of each servo sector. (In the context of FIG. 5, the beginning of each servo sector corresponds to the leading edge of a tooth on the toothed wheel 31.) After the revolution is completed wherein the pulses P1 are written, the read/write arm 21 is moved a radial distance equal to two-thirds of the track pitch, and the read/write transducer 19 is operated to write the pulses P2 a predetermined distance after the beginning of each servo sector S1, S2, etc., such that the pulses P2 are adjacent and substantially contiguous with the pulses P1. After the revolution is completed wherein the pulses P2 are written, the read/write arm 21 is again moved radially inward a distance equal to two-thirds of the track pitch, and the writing of the pulses P3 is begun. The pulses P3 are written a second predetermined distance after the beginning of each servo sector such that the pulses P3 are adjacent and substantially contiguous with the pulses P2. Then, after the pulses P3 are written at a given radial distance from the center of the disk 13 during a complete revolution of the disk, the read/write arm 21 is stepped radially by a distance equal to two-thirds of the track pitch and the write operation is initiated again for the pulses P1. This servo writing process is continued until a pattern of marker pulses P1, P2, P3, etc. are written in the servo sectors S1, S2, S3, etc. upon the face of the disk 13 such as shown in FIG. 2 and as previously described herein. Once the servo writing operation is complete, the servo sectors S1, S2, S3, etc. are utilized only for providing orientation information to the controller 25, and no further information is written in the servo sectors. For the reason that the size and placement of the servo sectors S1, S2, etc. are determined at the time of manufacture of the disk system, the servo sectors can be referred to as "hard" sectors.

In the tracking mode, the objective is to provide a servo control system such that the read/write transducer 19 follows closely the centerline of a designated track of data. For example, the object could be that the transducer 19 follow the centerline of track x as indicated in FIGS. 2 and 3. Such a tracking operation will be explained in conjunction with FIG. 3, in which it will be assumed initially that the read/write transducer 19 is positioned slightly radially inward of the centerline of track x. With the disk 13 rotating below the transducer 19 so that marker pulse P1 passes below the transducer followed by marker pulses P2 and P3, the magnetization which characterizes the pulses causes the read/write transducer 19 to generate electrical signals which are characteristic or analogs of the pulses. Those electrical signals are then carried to the controller 25, which simultaneously receives timing information from the spindle motor sensor system 27 which denotes the beginning of the servo sector and the expected time of arrival of the marker pulses P1, P2 and P3 within the sector. In the example based upon the orientations shown in FIG. 3, the read/write head 19 would sense all three pulses P1, P2 and P3 after entering the sector S1. After the pulse amplitudes are sensed by the read/write transducer 19, circuitry associated with the controller 25 functions to convert the analog signal output of the read/write transducer 19 to digital signals which can be processed by the controller 25. Such analog-to-digital conversion circuitry is well known. Once the amplitudes of the pulses P1, P2 and P3 are converted to digital form, the controller 25 operates to compare the magnitudes of three pulse signals and then operates electronically upon the two signals having the larger magnitudes.

Once the controller 25 determines which of the two pulse signals are the relatively stronger ones, the controller 25 proceeds to calculate an algebraic servo function which is a ratio whose denominator comprises a value representing the sum of the amplitudes of the two signals, and whose numerator comprises a value representing the difference in the amplitudes of the two signals. In the example given, where the read/write transducer 19 is slightly radially inward of the centerline of track x, the controller 25 will calculate the ratio:

$$\frac{P2 - P3}{P2 + P3} \qquad (1)$$

Two other servo functions which are computed for other locations of the read/write transducer 19 are shown in FIG. 4.

Included in the microprocessor of the controller 25 is a means which correlates the value of the servo function to movement required of the read/write transducer 19 in order that the read/write transducer 19 follow closely the centerline of a desired track. For example, if it is desired that the read/write transducer 19 follow the centerline of track x and the read/write transducer is positioned as shown in FIG. 3, the controller 25 will calculate the servo function value Vci, shown in FIG. 4, which indicates that the read/write transducer 19 is at a location radially inward of the desired location along the centerline of track x; accordingly, in such a situation, the controller 25 will provide a position-correcting signal to the motor 23 to cause the arm 21 to move the transducer 23 radially outward toward the centerline of the track x. As another example, if the controller 25 calculates a value such as Vco for the servo function, this indicates that the read/write transducer 19 is at a position radially outward of the center line of the track x and, accordingly, the controller 25 will provide a position-correcting signal to the motor 23 to move the read/write arm 21 such that the read/write transducer 19 travels radially inward toward the centerline of the track x. In practice, the position-correcting signal provides torque on the arm 21, and the magnitude of the torque depends upon the magnitude of the position-correcting signal.

The position-correcting signals provided by the controller 25 to the motor 23 are determined by commands stored in a memory, such as a ROM, associated with the microprocessor. The memory of the microprocessor which comprises the controller 25 can be understood to include a predetermined table of stored values to provide position correcting control signals to the motor 23, and those table values are provided as outputs of the controller 25 depending upon the input value of the servo function calculated for the particular servo sector over which the read/write transducer 19 has passed. In practice, the table of stored values is indexed according to the demoninator values of the servo function, and the value calculated for the denominator serves as a pointer to the table; also in practice, the position-correcting signal is obtained by multiplying a particular value found from the table by the calculated numerator value of the servo function. The table values are determined experimentally for a disk drive system of a given design configuration and, once determined, can be applied to all disk drive systems of the same design configuration. Further in practice, where the motor 23 is a non-stepper motor, the output signals from the controller 25 are converted to analog voltage signal by a conventional digital-to-analog converter (not shown) and are then provided to the motor 23.

Continuing with the above example, the controller 25 can determine that the read/write transducer 19 is following the centerline of track x rather than adjacent tracks w or y because of the pulses which comprise the servo function. That is, the pair of pulse values P2 and P3 appear in the function (1) when the read/write transducer 19 is following the centerline of track x, whereas the pair of pulse values P1 and P2 appear if the read/write transducer 19 is following the centerlines of adjacent tracks w or y. As mentioned earlier herein, the arrival times of the pulses P1, P2 and P3 differ from one another and, therefore, the controller 25 can utilize the aforementioned synchronizing signals to determine which pulses are being utilized to form the servo function at a particular location on the face of the disk 13; accordingly, the controller 25 can readily distinguish odd-numbered tracks, such as w and y, from even-numbered tracks such as x and z.

The operation of the control system to seek and find a particular desired track on the face of the disk 13 will now be described. Initially, it will be assumed that the read/write transducer 19 is at a known location. In practice, the initial known location is usually defined as "track zero" at the inner or outer periphery of the disk 13; the position of track zero can be physically defined, for example, by a so-called crash stop member which the read/write arm abutts against when the stop position is reached. Once the read/write transducer 19 is located at track zero or another known physical location, passage of the transducer over adjacent tracks can be readily sensed in terms of transitions between predominant pulse pairs P1-P2, P2-P3, and P3-P1. This operation can be seen graphically from the lower portion of FIG. 4. For purposes of explanation herein, the pulse-pairs can be referred to as zones, and the transition between one pulse-pair being predominant in amplitude to another pulse pair being predominant can be referred to as a traversing of zones. Thus, every time the controller 25 determines that a transition has occurred between the pair of pulses P1 and P2 being the predominant pulses to the pair of pulses P2 and P3 being the predominant pulses, the controller 25 can conclude that the read/write transducer 19 has traversed one zone. Then, when the pair of pulses P3-P1 is sensed as being the predominant pair of pulses, the controller 25 can conclude that the read/write transducer 19 has traversed a third zone in the same direction of travel. In practice, all three pairs of pulses P1-P2, P2-P3 and P3-P1 are utilized to detect whether zones have been traversed.

By counting transitions from zone to zone detected in the manner described above, the controller 25 can readily calculate the radial distance the read/write transducer 19 has traveled across the face of the disk 13. The calculated distance traveled can then be compared to the distance required to reach a desired track, and the motor 23 can be controlled accordingly. In practice, after the read/write arm 21 is in motion, the motor 23 is decelerated at a predetermined rate whenever the controller 25 determines that the transducer 19 is within a given number of tracks (typically, about fifteen tracks) of the desired or "target" track. Once the read/write arm 21 has carried the transducer 19 to the immediate vicinity of the target track, the system is operated in the track-following mode previously described.

It should now be appreciated that the above-described system permits controlled traversing of two tracks each time the read/write transducer 19 passes over a servo sector. Thus, for a complete revolution of a disk 13 having forty-six servo sectors S1, S2, etc. per track, ninety-two tracks can be traversed in a controlled manner per revolution of the disk 13. In practice, the above-described magnetic disk drive control system is utilized with rigid disks which have about six hundred concentric tracks of data per inch radially and which rotate about sixty revolutions per second. Thus, the time required for such systems to seek from track to track is about eight milliseconds (eight thousandths of a second). In such a system utilizing a disk of about 3.8 inches in diameter, the average access time to a desired track is 40 milliseconds, and the time required to seek completely across the face of a disk is about 150 milliseconds. A typical complete disk drive system comprises two double-sided disks providing total data storage capacity of about 20 megabytes.

It may be observed that the servo function values will be identical if the transducer is traversing any even number of tracks per each transition from servo sector to servo sector. That is, the same servo function values would be generated if the transducer 19 were moving exactly two tracks (i.e., three zones) radially for each servo sector traversed, or if the transducer 19 were moving exactly four tracks (i.e., six zones) radially for each servo sector traversed, or if the transducer 19 failed to move radially between servo sectors. Similarly, the same servo function values can be generated if the transducer 19 moves one, four, seven, etc. zones between servo sectors. To distinguish such situations from one another (e.g., to distinguish a situation where the transducer 19 moves one zone between servo sectors from a situation where the transducer moves four zones between servo sectors), the system includes conventional means to monitor the radial velocity of the transducer 19. In practice, the acceleration profile for the transducer 19 is planned such that the transducer 19 will not normally traverse more than three zones per each servo sector. In addition, the monitoring means is programmed to expect the radial velocity of the transducer at any time to be closely related to the radial velocity monitored during the immediately preceding monitoring period. Thus, for example, if the monitored radial velocity of the transducer 19 is three zones per sector and if the next monitored radial velocity can be interpreted as either one or four zones per sector, the program of the monitoring means will choose the interpretation of four zones per sector, because that velocity is closer to the precedingly monitored velocity (i.e., three zones per sector) than other possible choices (e.g., one zone per sector or seven zones per sector).

Although the present invention has been described with particular reference to the illustrated preferred embodiment, it is to be understood that such disclosure is not to be interpreted as limiting. Various other alterations, modifications and embodiments will no doubt become apparent to those skilled in the art after having read the preceding disclosure. For example, it will be apparent that sensing of sector locations can be accomplished optically, as by a laser system, rather than by the system of FIG. 5. As another example, it will be apparent to those skilled in the art that the control system will function equally effectively if the read/write transducer is placed upon a radially extending linear drive system rather than on the pivot arm 21. Accordingly, it is intended that the appended claims be interpreted as covering all such alterations, modifications and embodiments as fall within the true spirit and scope of the present invention.

I claim:

1. In a system for controlling the movement of a read/write transducer associated with a magnetic disk drive system in which the read/write arm is driven by a non-stepping motor to move across the face of a rotating disk, the improvement comprising:
    (a) equally spaced-apart servo sectors formed on the face of the disk, each of the servo sectors containing three sets of marker pulses, with the pulses in each set being radially aligned and spaced-apart radially from one another, said marker pulses in the first set being geometrically placed upon the face of the disk latitudinally adjacent and radially outward of said marker pulses of the second set which, in turn, are latitudinally adjacent and radially outward of said marker pulses of the third set; further, said marker pulses being arranged such that any group of three of said adjacent marker pulses spans two or fewer tracks on the face of the disk;
    (b) a read/write transducer for reading and writing said marker pulses, the read/write transducer being mounted to said read/write arm to travel therewith, the read/write transducer having an area of magnetic pick-up exceeding at least two-thirds of the centerline to centerline distance between adjacent tracks;
    (c) synchronizing means to provide first output signals coinciding with the beginning of each servo sector, second output signals following said first output signals to indicate the expected time of arrival of said second set of marker pulses within the sector, and third output signals to indicate the expected time of arrival of said third set of marker pulses within the sector;
    (d) microprocessor means to receive signals from the read/write transducer representative of the detected amplitude of said marker pulses transversed by the read/write transducer within a servo sector and to compare the amplitudes of said marker pulses transversed by said read/write transducer in said servo sector and to provide an electrical signal to control said non-stepping motor according to a servo function of the amplitude of the two largest amplitude marker pulses detected by the read/write transducer while traversing said sector.

2. A system according to claim 1 wherein, said marker pulses in said groups of three are contiguous to one another.

3. A system according to claim 2 wherein, the second of said marker pulses in any said group of three begins at a radial location radially outward of the location where the first of said marker pulses in said group terminates; and the third of said marker pulses in said group begins at a radial location radially outward of the location where the second of said marker pulses in said group terminates so that said pulses in said group overlap in the radial direction.

4. A system according to claim 3 wherein, the width of said read/write transducer, measured radially of the face of said disk, is about eighty percent of the radial width, centerline to centerline, of said tracks of data formed upon said face of said disk.

5. A system according to claim 1 wherein, said non-stepper motor is a voice-coil motor.

6. A system according to claim 1 wherein, the synchronizing means includes a toothed wheel which is rotatable with the disk, and sensor means to sense passage of individual teeth on said toothed wheel past a sensing position.

7. A system according to claim 6 wherein, said first output signal corresponds to passage of the leading edge of a tooth of said toothed wheel past said sensing location.

8. A system according to claim 1 wherein, the servo function comprises a ratio whose denominator value represents the sum of the amplitude of the two largest amplitude marker pulses detected by the read/write transducer and whose numerator represents the difference in amplitude between said two largest amplitude marker pulses.

9. A method for providing servo information on the face of a magnetic recording disk, which servo information is utilized for controlling the movement of a read/write transducer associated with a magnetic disk drive system in which a read/write arm is driven by a non-stepping motor to move across the face of the disk, said read/write transducer being capable of both reading and writing said servo information, the improvement comprising:

writing equally spaced-apart servo sectors on the face of the disk, each of the servo sectors containing three sets of marker pulses, with the pulses in each set being radially aligned and spaced-apart radially from one another, said marker pulses in the first set being placed upon the face of the disk latitudinally adjacent and radially outward of said marker pulses of the second set which, in turn, are latitudinally adjacent and radially outward of said marker pulses of the third set; further, said marker pulses being arranged such that any group of three of said adjacent marker pulses spans two or fewer tracks on the face of the disk.

10. The method of claim 9 wherein, said servo sectors are sized to comprise about ten percent of the data storage area on the face of a magnetic data storage disk, and the remaining area is available for data storage.

11. The method of claim 9 including the step of providing output signals at the time of each incremental rotation, which signals are utilized to synchronize formation of individual ones of said servo sectors.

12. A method for controlling the movement of a read/write transducer associated with a magnetic disk drive system in which the read/write arm is driven by a non-stepping motor to move across the face of a rotating disk, the improvement comprising:

(a) forming equally spaced-apart servo sectors on the face of the disk, each of the servo sectors containing three sets of marker pulses, with the pulses in each set being radially aligned and spaced-apart radially from one another, said marker pulses in the first set being placed upon the face of the disk latitudinally adjacent and radially outward of said marker pulses of the second set which, in turn, are latitudinally adjacent and radially outward of said marker pulses of the third set; further, said marker pulses being arranged such that any group of three of said adjacent marker pulses spans two or fewer tracks on the face of the disk;

(b) providing a read/write transducer for reading and writing said marker pulses, the read/write transducer being mounted to said read/write arm to travel therewith, the read/write transducer having an area of magnetic pick-up exceeding at least two-thirds of the centerline to centerline distance between adjacent tracks;

(c) providing first output signals coinciding with the beginning of each servo sector, second output signals following said first output signals to indicate the expected time of arrival of said second set of marker pulses within the sector, and third output signals to indicate the expected time of arrival of said third set of marker pulses within the sector;

(d) receiving signals from the read/write transducer representative of the detected amplitude of said marker pulses transversed by the read/write transducer within a servo sector; and (e) comparing the amplitudes of said marker pulses transversed by said read/write transducer in said servo sector and providing an electrical signal to control said non-stepping motor according to a servo function of the amplitude of the two largest amplitude marker pulses detected by the read/write tranducer while traversing said sector.

13. A method according to claim 12 wherein said marker pulses are written such that the second of said marker pulses in any said group of three begins at a radial location radially outward of the location where the first of said marker pulses in said group terminates, and the third of said marker pulses in said group begins at a radial location radially outward of the location where the second of said marker pulses in said group terminates.

14. The method of claim 12 wherein, said servo sectors comprise about ten percent of the data storage area on the face of a magnetic data storage disk, and the remaining area is available for data storage.

15. The method of claim 12 wherein, said function comprises a numerator value proportionate to the difference between said two greatest amplitudes and a denominator value proportionate to the sum of said two greatest amplitudes.

16. A method according to claim 15 further including the step of correlating predetermined position correcting signals to said non-stepper motor with the denominator values of said function, and providing said position correcting signals to said non-stepper motor in response to values of said function generated by said read/write transducer traversing one of said servo sectors.

17. A method for controlling the movement of a read/write transducer associated with a magnetic disk drive system in which the read/write arm is driven by a non-stepping motor to move across the face of a rotating disk, the improvement comprising:

(a) forming equally spaced-apart servo sectors on the face of the disk, each of the servo sectors containing three sets of marker pulses, with the pulses in each set being radially aligned and spaced-apart radially from one another, said marker pulses in the first set being placed upon the face of the disk latitudinally adjacent and radially outward of said marker pulses of the second set which, in turn, are latitudinally adjacent and radially outward of said marker pulses of the third set; further, said marker pulses being arranged such that any group of three adjacent marker pulses spans two or fewer tracks on the face of the disk;

(b) providing a read/write transducer for reading and writing said marker pulses, the read/write transducer being mounted to said read/write arm to travel therewith, the read/write transducer having an area of magnetic pick-up exceeding at least two-thirds of the centerline to centerline distance between adjacent tracks;

(c) providing first output signals coinciding with the beginning of each servo sector, second output signals following said first output signals to indicate the expected time of arrival of said second set of marker pulses within the sector, and third output signals to indicate the expected time of arrival of said third set of marker pulses within the sector;

(d) receiving signals from the read/write transducer representative of the detected amplitude of said marker pulses transversed by the read/write transducer within a servo sector; and (e) comparing the amplitudes of said marker pulses transversed by said read/write transducer in said servo sector and providing an electrical signal indicative of the identities of the two marker pulses having the two greatest amplitudes detected by the read/write transducer while traversing said sector; and (f) calculating the position of said read/write transducer according to transitions between one pair of said marker pulses having the greatest amplitudes sensed by said read/write transducer to another pair of said marker pulses having the greatest amplitude.

18. A method according to claim 17 wherein, said marker pulses in said groups of three are contiguous to one another.

19. A method according to claim 17 wherein, the second of said marker pulses in any said group of three is written to begin at a radial location radially outward of the location where the first of said marker pulses in said group terminates, and the third of said marker pulses in said group begins at a radial location radially outward of the location where the second of said marker pulses in said group terminates.

20. A method according to claim 19 wherein, the width of said read/write transducer, measured radially of the face of said disk, is about eighty percent of the radial width, centerline to centerline, of said tracks of data formed upon said face of said disk.

21. A method according to claim 20 wherein, said marker pulses are formed by high frequency bursts of current.

* * * * *